Dec. 8, 1942.  F. M. DEERHAKE  2,304,552
ELECTRIC REGULATOR
Filed Sept. 20, 1940
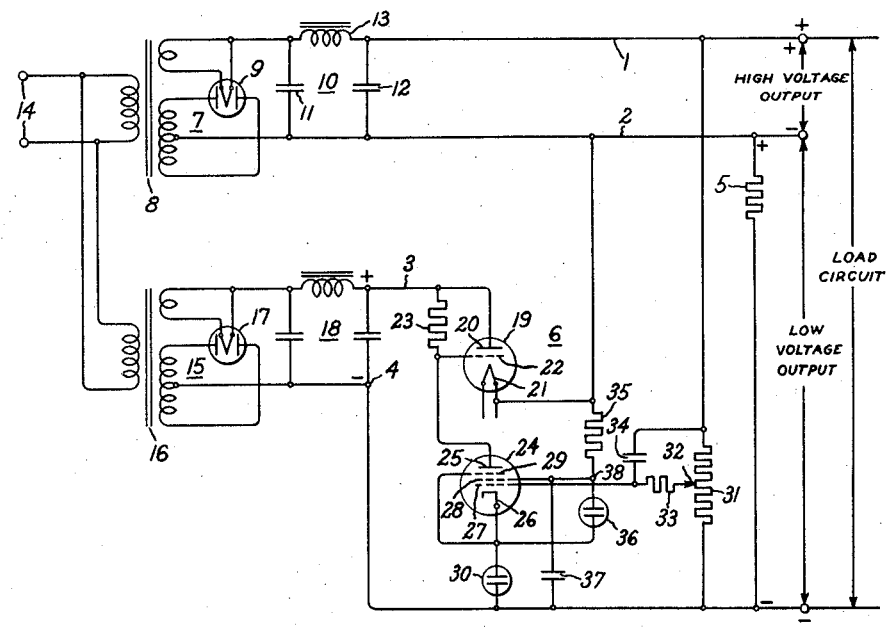
Inventor:
Franklin M. Deerhake,
by Harry E. Dunham
His Attorney.

Patented Dec. 8, 1942

2,304,552

UNITED STATES PATENT OFFICE 2,304,552

ELECTRIC REGULATOR

Franklin M. Deerhake, Schenectady, N. Y., assignor to General Electric Company, a corporation of New York Application September 20, 1940, Serial No. 357,591

8 Claims. (Cl. 171—312)

My invention relates to electric regulators and more particularly to electric regulators, including electric discharge devices, for controlling an electrical condition such as the voltage of a load circuit.

There has been evidenced a need for improved electric regulating equipment for controlling an electrical condition, such as the voltage of an associated load circuit, and which is rapid and positive in its response and which is easy to apply to load circuits of diversified character and wide voltage range. In accordance with the teachings of my invention described hereinafter, I provide a new and improved regulating circuit which affords advantages not offered by the prior art arrangements.

It is an object of my invention to provide a new and improved electric regulator.

It is another object of my invention to provide a new and improved electric regulator including an electric discharge device which controls the voltage supplied to a high voltage, direct current load circuit.

It is a further object of my invention to provide a new and improved electric regulator for controlling the voltage of a high voltage, direct current load circuit without subjecting the regulator to excessively high voltages.

Briefly stated, in the illustrated embodiment of my invention I provide a regulator comprising an electric discharge device which controls a high voltage direct current load circuit. A high voltage source of direct current and a low voltage source of direct current are connected in series relation to energize jointly the high voltage direct current load circuit. The high voltage source and the low voltage source may be interconnected through an impedance element, such as a resistance, which is variably energized by means of the regulator which interconnects the impedance element and the low voltage source. The electric discharge device is controlled in response to the voltage of the load circuit.

For a better understanding of my invention, reference may be had to the following description taken in connection with the accompanying drawing, and its scope will be pointed out in the appended claims. The single figure of the accompanying drawing diagrammatically illustrates my invention as applied to a system for energizing a high voltage direct current load circuit.

Referring now more particularly to the single figure of the drawing, my invention is illustrated as applied to a regulating system for controlling an electrical condition, such as the voltage, of a high voltage direct current load circuit. A source of high voltage direct current comprising a positive terminal or conductor 1 and a negative terminal or conductor 2 is interconnected with a low voltage source of direct current comprising a positive terminal or conductor 3 and a negative terminal or conductor 4 through a suitable impedance element, such as a resistance 5, and an electric regulator 6. In this manner, the electric regulator 6 is not subjected to high voltages of the order of magnitude impressed across the load circuit.

The source of high voltage direct current, including conductors 1 and 2, may be provided by any suitable arrangement such as a bi-phase rectifier 7 comprising a transformer 8, a rectifying device 9 and a filter circuit 10 comprising capacitors 11 and 12 and an inductance 13. The transformer 8 may be energized from any suitable source of alternating current 14 and the magnitude of the high voltage source is, of course, determined by the design of the rectifier 7 and choice of the proper turn ratio of the primary and secondary windings of the transformer 8. The low voltage source of direct current, including conductors 3 and 4, may be provided by a similar arrangement including a rectifier 15 comprising a transformer 16 and a rectifying device such as an electric valve 17. A suitable filtering circuit 18 may be interconnected between the rectifier 15 and the low voltage direct current circuit, so that the voltage variations due to the operation of the rectifier are minimized.

Electric regulator 6 comprises an electric discharge device 19, preferably of the high vacuum type, including an anode 20, a cathode 21, and being provided with a control means such as a control grid 22 which determines the current conducted thereby. Electric discharge device 19 conducts variable amounts of unidirectional current through resistance 5, thereby varying the voltage across the terminals of resistance 5 and maintaining the voltage impressed across the load circuit substantially constant. The amount of current conducted by the electric discharge device 19 is determined by the potential of its control grid 22. I provide suitable means for controlling the potential of grid 22 including a resistance 23 and an electric discharge device 24, also preferably of the high vacuum type. The electric discharge device 24 may include an anode 25, a cathode 26, a control grid 27, a screen grid 28 and a suppressor grid 29 which is preferably connected to the cathode 26. As a means for maintaining the potential of the cathode 26 substantially constant, I provide a suitable constant voltage device, such as a glow discharge valve 30, connected between the negative terminal or conductor 4 and the cathode 26.

As a means for controlling the conductivity or the current conducted by electric discharge device 24 in response to a predetermined controlling influence, such as the voltage or other electrical condition of the load circuit, I provide a voltage divider including a resistance 31 having an adjustable tap or connection 32 which is connected to control grid 27 of electric discharge device 24.

As a means for increasing the sensitivity of the electric discharge device 24 to rapid variations or high frequency variations in the voltage of the load circuit, I provide a resistance 33 and a capacitance 34, the left-hand common juncture of which is connected to the control grid 27. The right-hand terminal of resistance 33 may be connected to connection 32 and the magnitude of the resistance 33 is relatively large compared with that of the resistance 31. Resistance 33 and capacitance 34 serve to accentuate the high frequency variations of the load voltage so far as the control of the electric discharge device 24 is concerned, thereby causing the control system to be responsive to the high frequency variations of the load circuit.

Due to the fact that the output voltage of the regulator 6 under some conditions of operation must vary substantially in order to maintain the load voltage constant, the potential of the cathode 21 of electric discharge device 19 varies correspondingly. To maintain the sensitivity of the regulator 6 at a relatively high value, it is important to maintain the gain of the electric discharge device 24 within an optimum range of values. Consequently, I provide a voltage divider including, in series relation, a resistance 35 and a constant voltage device such as a glow discharge valve 36 to impress between the cathode 26 and the screen grid 28 a substantially constant voltage difference. By maintaining the voltage difference between the cathode 26 and the screen grid 28 constant throughout the range of operation of the regulator 6, it will be appreciated that the gain of the electric discharge device 26 is maintained within the optimum range which maintains or assures the sensitivity of the regulator.

The voltage impressed across the voltage divider including resistance 35 and glow discharge device 36 in some applications includes high frequency and low frequency components of voltage. The effective impedance of the glow discharge device 36 varies somewhat for wide ranges of the high frequency components of voltage derived from the load circuit. That is, for the high frequency components of voltage impressed across glow discharge device 36, the device offers substantially greater impedance than for the low frequency components. In order to maintain the impedance to the flow of high frequency and the relatively low frequency components of current through the voltage divider relatively constant, and thereby to maintain the potential difference between the cathode 26 and the screen grid 28 constant, I provide a capacitance 37 which is connected between the negative terminal of the load circuit and the screen grid 28. The capacitance 37 is designed to have a capacitive reactance of such a value that it by-passes the high frequency current if the voltage impressed across the voltage divider contains high frequency components which approach that range of values where the impedance of the glow discharge device 36 increases substantially.

Resistance 5 is preferably designed to have a relatively large ohmic value so that the load imposed on the regulator is relatively small compared to the output of the system. In this manner, the efficiency of the system is maintained at a high value and the regulation of the system is also of a satisfactory value.

Although the electric regulator 6 maintains the load voltage constant by varying the voltage appearing across the resistance 5, it is to be understood that only a small percentage of the power output of the regulator 6 may be consumed in the resistance 5. The greater portion or percentage of the power output of the regulator 6 is transmitted to the load circuit. Resistance 5 serves an additional function in providing a discharge path for the capacitors 11 and 12 of the rectifier 7 when the system is deenergized, thereby reducing the voltage appearing across the capacitors 11 and 12.

The operation of the embodiment of my invention shown in the single figure of the drawing will be explained by considering the system when it is operating to supply current of substantially constant voltage to the load circuit. In view of the fact that the high voltage circuit is designed to supply the larger portion of the output voltage, the regulator 6 is not subjected to high voltages. I have found, for example, that if it is desired to transmit power at substantially three thousand volts to the load circuit, the high voltage circuit or source may be designed to furnish substantially twenty-five hundred volts and the low voltage circuit may be designed to furnish power at plus or minus five hundred volts. In this manner, the regulator 6 is subjected to voltage of the order of magnitude of five hundred volts while the system supplies the desired three thousand volts to the load circuit. This feature is a decided advantage in view of the fact that certain types of electric regulators including electric discharge devices, while offering highly desirable advantages in precision and accuracy of control, are not susceptible of operating under much greater voltages. Consequently, an increase in range of output voltage is effective without subjecting the control equipment to inordinately high voltages. The electric discharge device 19 operates as a variable impedance inasmuch as its anode-cathode circuit is connected in series relation with the low voltage source including conductors 3 and 4 and the resistance 5. Electric discharge device 19, which conducts current continuously, transmits variable amounts of current through resistance 5, and the amount of current conducted is determined by the potential of control grid 22. The potential of the grid 22 is in turn determined by the amount of current transmitted through resistance 23 and the electric discharge device 24. As the current increases, the potential of control grid 22 decreases, causing the current conducted by discharge device 19 to decrease and consequently lowers the voltage across resistance 5.

To explain more fully the manner in which the regulating action is effected, let is be assumed that the voltage impressed across the load circuit tends to rise above the predetermined or preestablished value, the potential of control grid 27 rises causing the electric discharge 24 to transmit a greater amount of current through resistance 23. In this manner, the potential of control grid 22 of electric discharge device 19 is lowered and the electric discharge device 19 transmits a smaller amount of current through resistance 5, reducing the voltage across its terminals and consequently tending to restore the voltage impressed across the load circuit to the desired value.

The voltage divider including resistance 35 and the glow discharge valve 36 maintains the gain of the electric discharge device 24 within the optimum range even though the regulator 6 is required to operate throughout a wide voltage range to maintain the load voltage constant. The potential of the screen grid 28 remains constant by virtue of the operation of the glow discharge valve 36. Capacitance 37, which is designed to by-pass the high frequency components of current, also assists in the maintenance of the screen grid 28 at the fixed potential by by-passing the high frequency components when the current frequency range increases to that value where the effective impedance of the glow discharge valve 36 is increased.

The sensitivity of the regulator 6 is further increased due to the action of the resistance 33 and the capacitance 34. Where the regulator and associated system are applied to energize a supply circuit or a load circuit, which produces high frequency voltage variations or fluctuations, the resistance 33 and the capacitance 34 serve to transmit the high frequency impulses to the control grid 27 without disturbing the sensitivity of the regulator 6 to the average or mean value of the unidirectional voltage applied to the load circuit. It will be appreciated that the capacitance 34 by-passes the high frequency component of voltage, and inasmuch as the ohmic value of the resistance 33 is relatively large, the common juncture of the resistance 33 and the capacitance 34 also follows precisely the high frequency variations, effecting precise control of the current conducted by the electric discharge device 24.

An important advantage of apparatus built in accordance with my invention is the provision of a system which will energize a relatively high voltage load circuit while employing a regulator not subjected to the total or entire load voltage. In this manner, the regulator may be designed to have the maximum sensitivity and precision and at the same time permitting decided advantages in apparatus economy. An additional important feature of apparatus built in accordance with my invention is the high degree of sensitivity obtained, even though the output voltage of the regulator 6 varies throughout a substantial range. Due to the action of the voltage divider including resistance 35 and glow discharge valve 36, the sensitivity of the regulator 6 remains substantially constant even though the regulator is required to produce wide variations in output voltage.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of continuous unidirectional current, a second source of continuous unidirectional current, a load circuit, means for connecting the first mentioned source and said second source in series relation to energize said load circuit comprising an impedance element, means including an electric regulator comprising an electric discharge device for transmitting continuously variable amounts of unidirectional current through said impedance element from said second source to control the voltage appearing thereacross, said electric discharge device having an anode-cathode circuit connected in series relation with said second source and said impedance element, a pair of control means for said electric discharge device, means for controlling one of said control means in response to a predetermined electrical condition derived from said load circuit, and constant voltage means connected between the cathode of said discharge device and the other of said control means.

2. In combination, a source of direct current, a second source of direct current of a voltage substantially less than the voltage of the first mentioned source, a load circuit, means for connecting the first mentioned source and the second mentioned source in series relation to effect energization of said load circuit and comprising a resistance, an electric regulator comprising an electric discharge device having an anode, a cathode and a pair of control members, the anode-cathode circuit of said discharge device being connected in series relation with said second source and said resistance for continuously transmitting through said resistance variable amounts of unidirectional current, and means for variably energizing one of said control members in response to the voltage of said load circuit to control the current transmitted through said resistance to maintain the load voltage at a substantially constant value, and a glow discharge valve connected between said cathode and the other of said control members.

3. In combination, a source of high voltage direct current having a positive and negative terminal, a second source of low voltage direct current having a positive and negative terminal, a load circuit, an impedance element connected between the negative terminal of the high voltage source and the positive terminal of the low voltage source, the load circuit being connected to the positive terminal of the high voltage source and the negative terminal of the low voltage source, an electric regulator connected across said resistance for transmitting continuously variable amounts of unidirectional current from said second source through said resistance for maintaining the voltage applied to said load circuit at a substantially constant value and comprising an electric discharge device having an anode, a cathode and a control member, means responsive to the voltage of said load circuit for controlling the current conducted by said electric discharge device, and a glow discharge valve connected between said cathode and the negative terminal of said second source.

4. In combination, a source of current, a second source of current, a load circuit, means for connecting the first mentioned source and said second source in series relation to energize said load circuit and comprising an electric regulator including an electric discharge device comprising an anode, a cathode, a control grid and a screen grid, means for variably energizing said control grid to vary the output voltage of said regulator to maintain constant the voltage of said load circuit, and means for maintaining the gain of said electric discharge device within an optimum range of values comprising a voltage divider including a serially connected impedance element and a glow discharge valve, said glow discharge valve being connected across said cathode and said screen grid.

5. In combination, a source of current, a second source of current, a load circuit, means for connecting the first mentioned source and said second source in series relation to energize said load circuit comprising an impedance element, means including an electric regulator for varying the voltage appearing across said impedance element to maintain constant the voltage of said load circuit, said regulator comprising an electric discharge device including an anode, a cathode, a control grid and a screen grid, means for variably energizing said control grid in accordance with the voltage of said load circuit, and means for impressing across said cathode and said screen grid a substantially constant voltage comprising a voltage divider including a serially connected resistance and a glow discharge valve, said glow discharge valve being directly connected across said cathode and said screen grid.

6. In combination, a source of current, a second source of current, a load circuit, means for connecting the first mentioned source and said second source in series relation to energize said load circuit and comprising an electric regulator including an electric discharge device having an anode, a cathode, a control grid and a screen grid, means for impressing a variable control potential on said control grid in accordance with the voltage of said load circuit, and means for maintaining the potential of said screen grid substantially constant comprising a voltage divider including a glow discharge valve connected across said cathode and said screen grid.

7. In combination, a source of current, a second source of current, a load circuit having positive and negative terminals, means for connecting the first mentioned source and said second source in series relation to energize said load circuit and comprising an electric regulator including an electric discharge device having an anode, a cathode, a control grid and a screen grid, means for impressing a variable control potential on said control grid in accordance with the voltage of said load circuit, and means for maintaining the gain of said electric discharge device within an optimum range of values irrespective of the magnitude of the output voltage of said regulator comprising a voltage divider including a serially connected resistance and a glow discharge valve and a capacitance connected between said screen grid and the negative terminal of said load circuit.

8. In combination, a source of current, a second source of current, a load circuit having positive and negative terminals, means for connecting the first mentioned source and said second source in series relation to energize said load circuit comprising an electric regulator including an electric discharge device having an anode, a cathode, a control grid and a screen grid, means for maintaining the potential of said cathode substantially constant comprising a glow discharge valve connected between said cathode and the negative terminal of said load circuit, means for impressing on said control grid a variable potential to maintain the voltage of said load circuit substantially constant, and means for maintaining the gain of said electric discharge device within an optimum range of values for variable output voltages of said regulator comprising a voltage divider including a second glow discharge valve connected directly across said cathode and said screen grid, and a capacitance connected between said screen grid and said negative terminal to by-pass high frequency components of current.

FRANKLIN M. DEERHAKE.